UNITED STATES PATENT OFFICE.

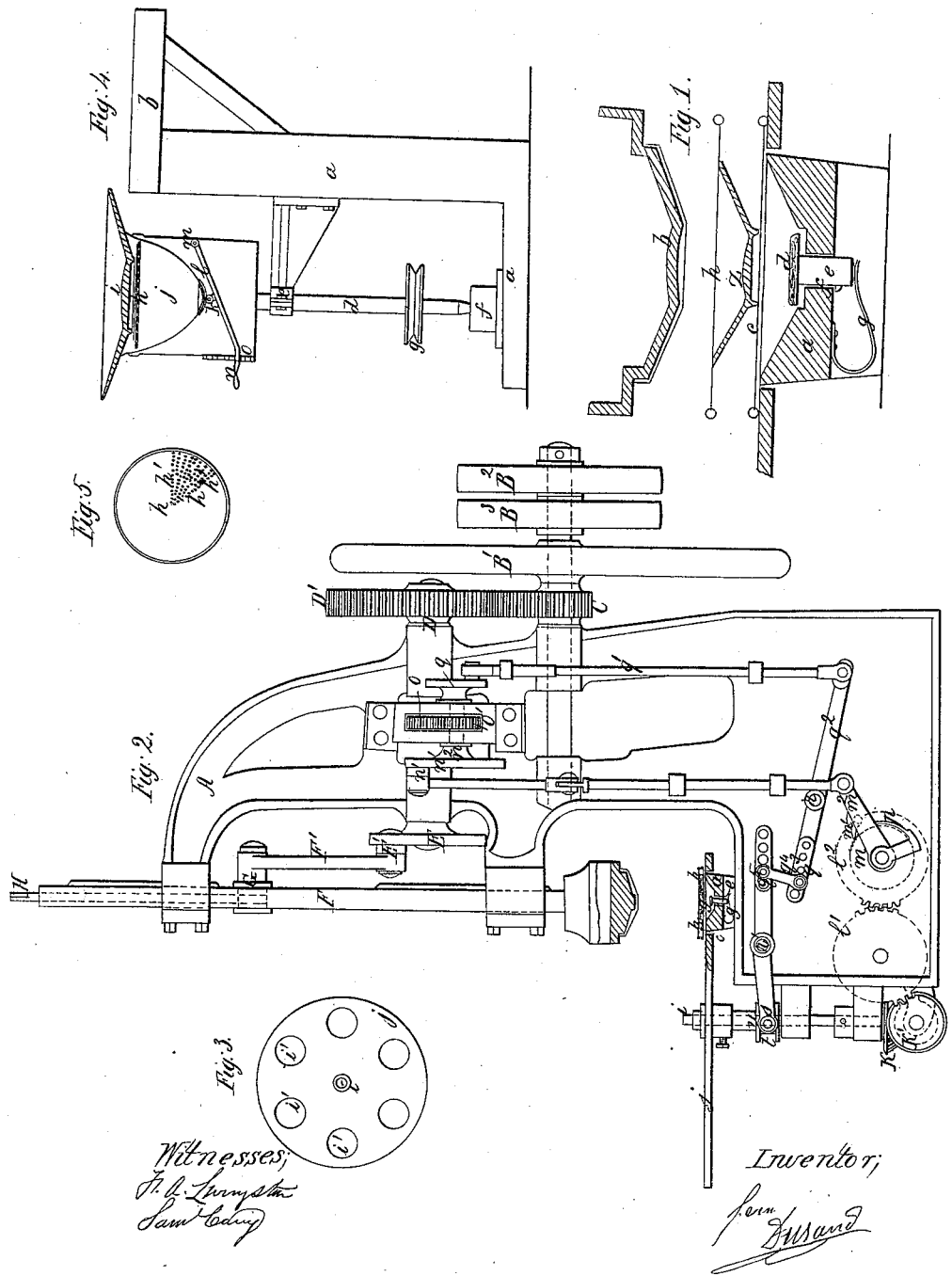

FRANÇOIS DURAND, OF PARIS, FRANCE.

MODE OF MOLDING AND FINISHING POTTERY-WARE.

Specification forming part of Letters Patent No. 44,270, dated September 13, 1864.

*To all whom it may concern:*

Be it known that I, FRANÇOIS DURAND, of Paris, Empire of France, have invented a new and improved mode of molding and finishing articles of china or other clay, or of other suitable plastic materials; and I do hereby declare that the following is a full and exact description thereof, reference being had to the accompanying drawings, and to the letters of reference marked thereon.

These improvements in molding and finishing articles of china or other clay, or of other suitable plastic materials, such, for instance, as gypsum, soap, paste, putty, or others, relate to the manufacture of articles of such shape as allows of molding them by pressing or stamping the plastic material in a clammy or moistened state in a suitable mold, the object of the invention being principally to allow of unmolding without risk of deforming or distorting the shape of the molded article.

The invention is particularly applicable to the molding of articles usually made of china or other clay, stoneware, or other similar materials, such, for instance, as round, oval, or other sorts of dishes, plates, saucers, and other articles of the same class, which hitherto were molded by hand or on the potter's lathe, whereas by my invention this molding may be performed in a mechanical manner.

In principle my invention consists in molding by mechanical means articles of a suitable shape of china or pottery clay or other suitable ceramic or other pastes.

In order to make the invention better and more easily understood, I will now refer to the annexed drawings, in which—

Figure 1 represents a vertical sectional view at actual size of a mold, matrix, or lower die, and of an upper or counter die or stamping-tool, such, for instance, as may be made use of for molding saucers.

The lower die, $a$, may be fixed in a suitable bed-plate or table, and the distance at which the upper or counter die, $b$, is to be situated from the lower one may be regulated by a set-screw or other suitable means, my invention consisting in the arrangement and mode of acting of the dies $a$ and $b$ and of the completive parts added thereto; and, as it is important for rendering an invention really practicable that the required effects should take place at the required moments and with proper preciseness and velocity, I will also describe the mechanical arrangement for the working of the said dies and parts. The lower die or mold, $a$, is arranged in such manner that a thin sheet of india-rubber, $c$, or other similar suitable elastic material, may be laid or spread over its upper surface, either fixed thereto or in a movable manner. Thus, for instance, the sheet of india-rubber may be either held or extended in a movable frame, or the said sheet may be fixed all around to the sides of the mold $a$, or to the bed-plate of this latter. The inner central or bottom part, $d$, of the mold or lower die, $a$, may be caused to move vertically by having the said part $d$ fixed to a rod, $e$, provided with one or more longitudinal flutings, serrations, or grooves, $f$, for allowing that, during the molding of the saucer or other article, the air contained between the india-rubber $c$ and the mold $a$ may by these grooves $f$ take its exit, while the said grooves $f$ may be made to serve also as guides for the working of the rod $e$. A spring, $g$, causes the central or movable bottom part, $d$, to rise whenever the upper die, after having been lowered and caused this part $d$ to come in contact with the mold $a$, performs its ascending motion. For preventing that by the effect of a partial vacuum, the india-rubber $c$ should remain adhering to the movable bottom part $d$. A piece of silk or other suitable tissue or material, allowing the air to pass freely through its mashes or pores is laid over the top of this part $d$, while the lower surface of the upper die, $b$, is covered in a similar manner, as shown by the blue line in Figs. 1 and 2, over which tissue and the clay or other plastic material to be molded is laid a sheet of india-rubber, $h$, (shown by a red line in Figs. 1 and 2,) similar to that, $c$, laid over the mold. By this interposition of the said tissue or suitable permeable material between the upper die and the sheet $h$ the air is allowed to escape from between the mold and the upper die at the moment the molding takes place. It will further be readily understood that during the molding the sheets $c$ and $h$ will apply themselves exactly to the full outline of both dies, and that the lump or cake $z$, of clay or other plastic material, interposed between the said sheets $c$ and $h$, will be squeezed out or flattened and become molded in the required form; and as, during this molding, the sheets $c$ and $h$, by applying themselves to the outlines of both dies, will have extended so as to correspond with these outlines, their elasticity will cause them, as soon as the upper die, $b$, performs its ascending motion, to contract to their original size, and thereby separate not only from the dies, but also from the molded article Z, so as to cause the latter to be lifted out of the mold and stand entirely liberated and in the required shape on the elastic sheet $c$, covering this latter. It will be further understood that by my invention articles of any suitable shape, size, or thickness may be molded. Should the article require to be molded very thin, a sheet of paper may, before molding, be placed under and above the lump or cake of clay or other plastic material to be molded, which sheets of paper will consequently become stamped or molded simultaneously with and adhere to the article, and will be got rid of in baking.

Although my improved process of molding may be performed by hand labor, I prefer, however, to make use for this purpose of the mechanical arrangement represented in vertical elevation view in Fig. 4 with some parts shown in section.

A is a cast-iron or other strong frame, provided with bearings for the main and other arbors or shafts to revolve in.

B is the main arbor or driving-shaft, provided with fly-wheel B′ and fast and loose pulleys B² and B³, in case the machine is to be driven by power, or with crank-handle if to be worked by hand. This arbor B has a pinion, C, working the wheel D′, fitted on the arbor D.

E is a disk, with crank-pin E′, connected to the rod F′, the latter connected by a jointed part, G, to the carrier F of the upper die, $b$. A regulating or set screw, H, allows of bringing the upper die, $b$, exactly in the required position in respect to the lower die or mold, $a$, for regulating the thickness of the article to be molded. The lower die, $a$, is fixed in a bed-plate in the frame A. $j$ is a horizontal disk turning on a vertical spindle, $i$, and provided round its periphery with a series of holes, $i'$ as represented in plan view in Fig. 3. An intermittent rotary motion is transmitted to this disk $j$, so as to carry in regular succession each of the holes $i'$ between the upper and lower die, with its centrum in the corresponding axial lines of both dies.

During the molding the operative who is to provide the machine with clay or other plastic material successively places over each of the holes $i'$ a sheet, $c$, of india-rubber or other suitable elastic material, fitted in a frame corresponding in diameter with that of the hole $i'$, but a little larger than this latter, and on the centrum of this sheet $c$ he lays a lump or ball of clay, by preference, however, flattened out in the shape of a round flat cake, $z$, over which he then applies the movable sheet $h$ of india-rubber, above mentioned. The disk $j$ then rises, and thereby allows the molded articles Z of being lifted out of the mold or lower die, after which the disk turns round to the required distance by the effect of the bevel-wheels K and K′, the one, K, fitted to the lower end of the spindle $i$, and by means of the gear-wheels $l$, $l'$, and $l^2$, on the axis of which latter is fitted a ratchet-wheel, $m$, and a lever, $m^2$, carrying the pawl or catch $m'$. A curved arm, $p$, fixed to the axis of the wheel $w$ serves for lifting the catch $m'$ at the required moment and for preventing the same to pass over more than the required number of teeth. The lever $m^2$ is worked by means of a rod, $n$, connected to the crank $n'$, fitted on the arbor $n^2$, this latter receiving its rotary motion by means of the pinions $o'$ and $o$, the latter fitted on the arbor D, whereas the other pinion, $o'$, forms part of the arbor $n^2$, to one end of which is fixed the crank $n'$, while the other end has a crank, $q$, connected by the rod $q'$ to the arm $q^2$ of a lever, $q^2$ $r$ $q^3$, turning upon a pin, $r$, the opposite end, $q^3$, of this lever being connected by a link, $q^4$, to the arm $q^5$ of the lever $q^5$ $r'$ $s$, the forked end $s$ of which works in the neck $t$ of a socket, $u$, forming part of the disk $j$, and by means of which socket the disk $j$ is lifted and afterward lowered at the required moments, viz., before or after the same has turned round—and thus lifts this disk from off the mold $a$ as soon as the article has been molded, after which the disk turns round for one step, and another hole, $i'$, falls over the mold $a$, in order to allow of producing another molding, and so on.

In order to prevent that thin articles should become distorted, a small hollow form or mold of the same shape as the mold $a$ might be laid on the sheet $c$ and be provided with the clay or other plastic material from which the article is to be molded, the molded article remaining till sufficiently dry in this small mold, which ought to be made of thin sheet metal or other suitable material and stamped in the required shape.

After the saucers, plates, dishes, or other similar articles have been molded and have acquired the required firmness the barbs or pins are to be removed from them, for which purpose I prefer using the potter's lathe represented in vertical side elevation view in Fig. 4. In this figure, $a$ represents the frame, with shelf $b$ for the tools. $c$ is a box, of a cylindrical or other suitable shape, fitted on a vertical spindle or shaft, $d$, turning in a collar, $e$, and step $f$. $g$ is the working-pulley receiving the driving cord or band. $h$ is the cover or lid of the box $c$. (Represented separately in plain view in Fig. 5.) This lid is provided with a great many perforations, $h'$, (of which only a part are indicated in Fig. 5,) and forms the throwing-disk of the lathe. The outer surface of this lid is covered with felt or any other suitable material or tissue on which the article to be finished—such, for instance, as a plate, $i$—is placed. $j$ is an inverted bell or pouch, of india-rubber, the upper rim of which is firmly held between the lid *h* and the box *c* in such manner that the plate *i* rests on this rim. The lower part of the bell or pouch *j* is connected by a joint, *k*, to the lever *l*, this latter turning at one end upon a pin, *m*, while the other end is provided with a handle, *n*, so as to allow of fixing the lever in one or the other of the notches of the rack *o*, and by thus extending the pouch *j* cause more or less vacuum or suction to be produced in this latter, by means of which suction or partial vacuum the plate *i* is firmly connected to the upper rim of the pouch, thus allowing of finishing the said plate or other article thus connected with the utmost nicety.

Having thus described and particularly ascertained the nature of my invention and the manner in which the same is or may be practically executed, I declare that what I consider to be novel and original, and consequently claim as my invention, is—

1. By making use of thin sheets of india-rubber or other suitable elastic material, fixed or not on the mold or lower die, and on the upper on counter die or stamping-tool, in the manner as above described, with an intermediate tissue interposed or not, as required, for the purpose of allowing the free escape of the air contained between the upper and lower dies, so as to allow an automatical molding and unmolding of any article of ceramic or other suitable plastic material.

2. The improvement in the potter's lathe, represented in Fig. 4, in which lathe an india-rubber or other suitable impermeable elastic pouch or inverted bell-shaped bag serves for steadying or fixing in position the article to be finished by the effect of a partial vacuum or suction underneath the same in the said pouch or bag.

FRANÇOIS DURAND.

Witnesses:
S. CARY,
JOHN T. NOYE.